United States Patent
Mengibar

(10) Patent No.: US 11,017,769 B2
(45) Date of Patent: *May 25, 2021

(54) CUSTOMIZED VOICE ACTION SYSTEM

(71) Applicant: Google LLC, Mountain View, CA (US)

(72) Inventor: Pedro J. Moreno Mengibar, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/374,343

(22) Filed: Apr. 3, 2019

(65) Prior Publication Data

US 2019/0228771 A1    Jul. 25, 2019

Related U.S. Application Data

(63) Continuation of application No. 15/638,285, filed on Jun. 29, 2017, now Pat. No. 10,283,118, which is a
(Continued)

(51) Int. Cl.
| | |
|---|---|
| G10L 15/00 | (2013.01) |
| G06Q 30/00 | (2012.01) |
| G10L 15/22 | (2006.01) |
| G06Q 30/02 | (2012.01) |
| G06F 40/242 | (2020.01) |
| G06Q 30/08 | (2012.01) |

(Continued)

(52) U.S. Cl.
CPC ............ *G10L 15/22* (2013.01); *G06F 40/242* (2020.01); *G06Q 30/0256* (2013.01); *G06Q 30/0275* (2013.01); *G06Q 30/0277* (2013.01); *G06Q 30/08* (2013.01); *G10L 15/08* (2013.01); *G10L 15/197* (2013.01); *G10L 2015/088* (2013.01); *G10L 2015/223* (2013.01)

(58) Field of Classification Search
CPC .......................... G10L 15/183; G06Q 30/0241
See application file for complete search history.

(56) References Cited

U.S. PATENT DOCUMENTS

| | | |
|---|---|---|
| 5,218,668 A | 6/1993 | Higgins et al. |
| 7,698,136 B1 | 4/2010 | Nguyen et al. |
| (Continued) | | |

OTHER PUBLICATIONS

"Walmart and Google to offer voice-enabled shopping", BBC News, Aug. 23, 2017 (10 pages).
(Continued)

*Primary Examiner* — Jialong He
(74) *Attorney, Agent, or Firm* — Foley & Lardner LLP

(57) ABSTRACT

Systems, methods, and computer-readable media that may be used to modify a voice action system to include voice actions provided by advertisers or users are provided. One method includes receiving electronic voice action bids from advertisers to modify the voice action system to include a specific voice action (e.g., a triggering phrase and an action). One or more bids may be selected. The method includes, for each of the selected bids, modifying data associated with the voice action system to include the voice action associated with the bid, such that the action associated with the respective voice action is performed when voice input from a user is received that the voice action system determines to correspond to the triggering phrase associated with the respective voice action.

20 Claims, 6 Drawing Sheets

Related U.S. Application Data continuation of application No. 15/054,301, filed on Feb. 26, 2016, now Pat. No. 10,147,422, which is a continuation of application No. 13/478,803, filed on May 23, 2012, now Pat. No. 9,275,411.

(51) Int. Cl.
  *G10L 15/08* (2006.01)
  *G10L 15/197* (2013.01)

(56) References Cited

U.S. PATENT DOCUMENTS

| | | | |
|---|---|---|---|
| 7,983,915 | B2 | 7/2011 | Knight et al. |
| 8,082,510 | B2 | 12/2011 | Patel et al. |
| 8,509,403 | B2 | 8/2013 | Chiu et al. |
| 8,831,987 | B2 | 9/2014 | Knapp et al. |
| 2002/0095330 | A1 | 7/2002 | Berkowitz et al. |
| 2002/0123891 | A1 | 9/2002 | Epstein |
| 2003/0200086 | A1 | 10/2003 | Kawazoe et al. |
| 2004/0199496 | A1 | 10/2004 | Liu et al. |
| 2004/0236575 | A1 | 11/2004 | Goronzy et al. |
| 2005/0137868 | A1 | 6/2005 | Epstein et al. |
| 2005/0149407 | A1 | 7/2005 | Kamiwada et al. |
| 2007/0005421 | A1 | 1/2007 | Labio et al. |
| 2007/0078709 | A1 | 4/2007 | Rajaram |
| 2007/0162379 | A1 | 7/2007 | Skinner |
| 2007/0233487 | A1 | 10/2007 | Cohen et al. |
| 2007/0239453 | A1 | 10/2007 | Paek et al. |
| 2008/0010141 | A1 | 1/2008 | Smith et al. |
| 2008/0040221 | A1 | 2/2008 | Wiseman et al. |
| 2008/0052076 | A1 | 2/2008 | Metz |
| 2008/0189110 | A1 | 8/2008 | Freeman et al. |
| 2009/0089144 | A1 | 4/2009 | Hodge, Jr. |
| 2009/0144124 | A1 | 6/2009 | Surendran et al. |
| 2010/0106498 | A1 | 4/2010 | Morrison |
| 2010/0179811 | A1 | 7/2010 | Gupta et al. |
| 2010/0293057 | A1 | 11/2010 | Haveliwala et al. |
| 2011/0184730 | A1* | 7/2011 | LeBeau .................. G10L 15/30 704/201 |
| 2011/0184803 | A1 | 7/2011 | Even-Dar et al. |
| 2011/0196733 | A1 | 8/2011 | Li et al. |
| 2011/0271194 | A1 | 11/2011 | Lin et al. |
| 2012/0022950 | A1 | 1/2012 | Gilbert et al. |
| 2012/0166291 | A1 | 6/2012 | Broder et al. |
| 2012/0239488 | A1 | 9/2012 | Zimmerman et al. |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition Within Messages", May 11, 2017, 11 pages.
Buckland et al., "Amazon's Alexa Takes Open-Source Route to Beat Google Into Cars", Bloomberg, Feb. 27, 2018, 6 pages.
Chen, Yilun Lulu, "Alibaba Challenges Google, Amazon With New Echo-Like Device", Bloomberg, Jul. 5, 2017, 3 pages.
Clover, Juli, "Amazon and Google Want to Turn Their Smart Home Speakers Into Telephone Replacements", Feb. 15, 2017, 9 pages.
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", the Guardian, Jul. 12, 2017 (3 pages).
Golgowski, Nina, "This Burger King Ad is Trying to Control Your Google Home Device", Huffpost, Apr. 12, 2017 (7 pages).
Google Developers Newsletter "Google Assistant SDK", developers.google.com, retrieved on Jul. 12, 2017, 2 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, Mark and Webb, Alex, "Apple is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report & Written Opinion on PCT/US2013/039075 dated Feb. 20, 2014.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena "Google Home Now Recognizes Your Individual Voice" Apr. 20, 2017, 6 pages.
Lee, Take Two for Samsung's troubled Bixby assistant , BBC News, Oct. 19, 2017, 6 pages.
Lee, Dave, "The five big announcements from Google I/O", BBC, May 18, 2017, 11 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can Tell You How Much That's Worth",CBS Interactive, Inc. 3 pages.
Non-Final Office Action on U.S. Appl. No. 15/638,285 dated Aug. 10, 2018.

(56) References Cited

OTHER PUBLICATIONS

Notice of Allowance on U.S. Appl. No. 15/054,301 dated Jul. 30, 2018.
Notice of Allowance on U.S. Appl. No. 15/054,301 dated Aug. 14, 2018.
Notice of Allowance on U.S. Appl. No. 15/638,285 dated Dec. 19, 2018.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network tor Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, dated May 31, 2017, 6 pages.
Seifert, Dan, "Samsung's new virtual assistant will make using your phone easier", the Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Unknown Author, "'Dolphin' attacks fool Amazon, Google voice assistants", BBC News, Sep. 7, 2017, 8 pages.
U.S. Notice of Allowance on U.S. Appl. No. 13/478,803 dated Oct. 28, 2015.
U.S. Office Action on U.S. Appl. No. 13/478,803 dated Apr. 14, 2015.
U.S. Office Action on U.S. Appl. No. 13/478,803 dated Aug. 25, 2015.
U.S. Office Action on U.S. Appl. No. 13/478,829 dated Apr. 14, 2015.
U.S. Office Action on U.S. Appl. No. 15/054,301 dated May 24, 2017.
U.S. Office Action on U.S. Appl. No. 15/054,301 dated Aug. 29, 2017.
U.S. Office Action on U.S. Appl. No. 15/054,301 dated May 15, 2018.
Willens, Max, "For publishers, Amazon Alexa holds promise but not much money (yet)", Digiday, Jul. 6, 2017, 5 pages.

* cited by examiner

CUSTOMIZED VOICE ACTION SYSTEM

CROSS-REFERENCES TO RELATED APPLICATIONS

This application claims the benefit of priority under 35 U.S.C. § 120 as a continuation of U.S. patent application Ser. No. 15/638,285, filed Jun. 29, 2017, which claims the benefit of priority under 35 U.S.C. § 120 as a continuation of U.S. patent application Ser. No. 15/054,301, filed Feb. 26, 2016, which claims the benefit of priority under 35 U.S.C. § 120 as a continuation of U.S. patent application Ser. No. 13/478,803, filed May 23, 2012, each of which is hereby incorporated by reference herein in its entirety.

BACKGROUND

Voice actions provide a way for users of a computing device to make the device perform certain actions using audio input (e.g., using a microphone of the device). For example, to call a particular business, a user of a smartphone may look up the number for the business using a browser application and then use a calling application to enter the telephone number and call the business. A voice action system may enable the user to use a voice command, such as "call ABC Motors in Mountain View, Calif." to perform the same desired action. Voice actions may provide a simple, natural way for users to enter commands into a device and may be particularly useful in settings where it may be difficult for the user to provide input using other methods. Voice actions are typically limited to a set of predefined triggering phrases and associated actions.

SUMMARY

One implementation of the disclosure relates to a method that includes receiving, at a voice action system comprising at least one server computing system, electronic voice action bids from a plurality of advertisers. Each of the electronic voice action bids represents an offer for modifying the voice action system to include a voice action associated with the electronic voice action bid. A voice action includes a triggering phrase and an action and the triggering phrase includes one or more words. The method includes selecting, using the voice action system, one or more electronic voice action bids from among the plurality of electronic voice action bids. The method includes, for each of the selected electronic voice action bids, modifying data associated with the voice action system to include the voice action associated with the electronic voice action bid, such that the action associated with the respective voice action is performed when voice input from a user is received that the voice action system determines to correspond to the triggering phrase associated with the respective voice action.

Another implementation of the disclosure relates to a voice action system including at least one computing device operably coupled to at least one memory and configured to receive electronic voice action bids from a plurality of advertisers. Each of the electronic voice action bids represents an offer for modifying the voice action system to include a voice action associated with the electronic voice action bid. A voice action includes a triggering phrase and an action, and the triggering phrase comprises one or more words. The at least one computing device is configured to select one or more electronic voice action bids from among the plurality of electronic voice action bids. The at least one computing device is configured to, for each of the selected electronic voice action bids, modify data associated with the voice action system to include the voice action associated with the electronic voice action bid, such that the action associated with the respective voice action is performed when voice input from a user is received that corresponds to the triggering phrase associated with the respective voice action. The voice action system includes a memory having a voice action language model database stored therein that includes words that the voice action system is configured to recognize as being associated with a triggering phrase of one or more voice actions.

Another implementation of the disclosure relates to a computer-readable medium having instructions stored thereon that, when executed by a processor, cause the processor to perform operations including receiving a plurality of electronic voice action suggestions. Each of the electronic voice action suggestions comprises a voice action that a user proposes to include in a voice action system. A voice action includes a triggering phrase and an action, and the triggering phrase includes one or more words. The operations include selecting one or more electronic voice action suggestions from among the plurality of electronic voice action suggestions. The operations further include, for each of the selected electronic voice action suggestions, modifying data associated with the voice action system to include the voice action associated with the electronic voice action suggestion, such that the action associated with the respective voice action is performed when voice input from a user is received that the voice action system determines to correspond to the triggering phrase associated with the respective voice action.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Referring generally to the Figures, various illustrative systems and methods are provided that may be used to customize a voice action system using voice actions that are provided by an advertiser and/or a user. Voice actions are used to activate certain special, predetermined behaviors on a phone. For example, a user may say "play music by Bon Jovi" and the phone may open a music playing application and play music by the artist Bon Jovi, or the user may say "map address X" and the phone may open a mapping application and display a map of address X. The commands are typically predetermined triggering phrases that cause certain predetermined actions to be performed.

The present disclosure describes various methods and features for implementing custom voice actions provided by third parties. For example, advertisers may pay (e.g., via a bidding process) for their specified voice actions to be included in the voice search system and to execute certain actions. For example, the advertisers may bid to be a part of a voice action for the day, and if they have a winning bid, their triggering phrases (e.g., "Brand 1 Free Tickets!") and associated actions (e.g., navigating to a Brand 1 website, downloading a Brand 1 app, etc.) would be inserted into the voice search system. A wide variety of different actions could be implemented upon recognition of the phrase by the voice search system, such as opening a particular website in a browser, downloading an application or media file, displaying a location and/or providing directions in a mapping program, starting a text, audio, or video chat with one or more other co-users, performing a series of actions such as opening an application and performing one or more actions within the application, etc. In some implementations, complex voice actions may be performed, such as opening a website in a web browser (e.g., a travel website) and performing certain actions on the website based on the voice input (e.g., using a travel search engine provided on the website to search for prices for flights from New York to San Francisco on Jul. 12, 2012). In some implementations, voice actions to be added to the voice action system may be selected from among voice action suggestions provided by users (e.g., rather than bids from advertisers).

Figure 1:
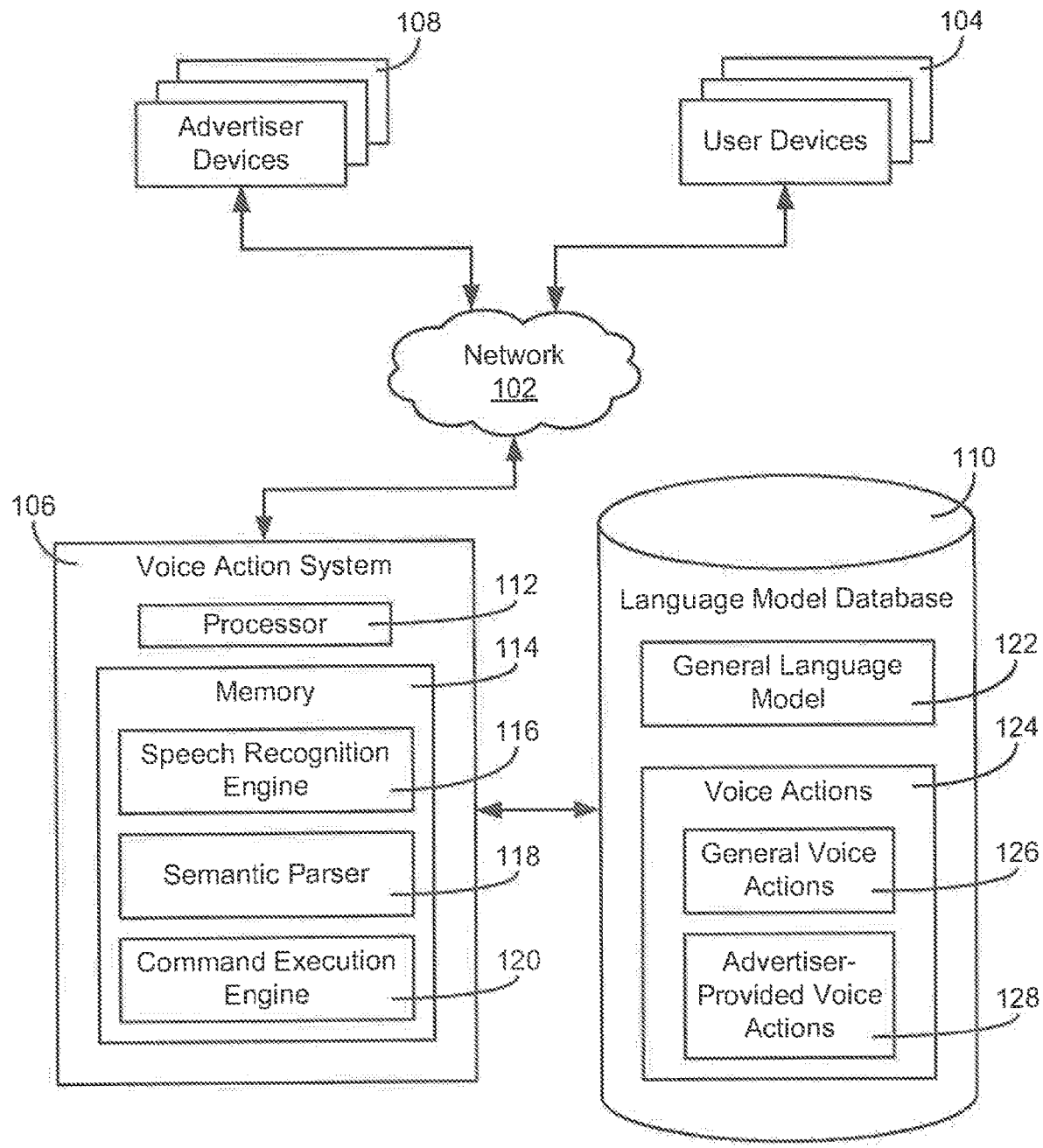
FIG. 1 is a block diagram of an example voice action system and associated environment according to an illustrative implementation.

FIG. 1 illustrates a block diagram of an example voice action system 106 and associated environment 100 according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an internet browser such as Google Chrome), media files, and/or any other types of content. User devices 104 may be configured to enable users to perform at least some of the actions using voice actions, where the users may provide voice input to the user devices 104 (e.g., using a microphone of the user devices 104) and the voice input may cause a particular action to be performed. As described in further detail below, in some implementations, the voice input may be interpreted and the actions may be carried out at least partially through the use of a voice action system 106.

User device 104 may be any type of computing device (e.g., having a processor and memory or other type of computer-readable medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set, such as a Google TV device. In some implementations, content may be provided via a web-based application and/or an application resident on a user device 104. In some implementations, user devices 104 may be designed to use various types of software and/or operating systems, such as the Google Android operating system. In various illustrative implementations, user devices 104 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 may be configured to receive data from various sources using a network 102. In some implementations, network 102 may comprise a computing network (e.g., LAN, WAN, Internet, etc.) to which user devices 104 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

In various illustrative implementations, a voice action system 106 may be used to enable users to use voice actions to perform certain actions. Voice input may be provided by users through a microphone or other audio input device of user devices 104, and the voice input and/or data relating to the voice input may be transmitted from user devices 104 to voice action system 106. Voice action system 106 may determine voice actions or commands to be taken based on the voice input. Once a particular voice action has been determined, voice action system 106 may carry out the action related to the voice action. In various implementations and/or for various actions, voice action system 106, user devices 104, or a combination thereof may be configured to carry out the action. Voice action system 106 is described with reference to the illustrative implementation of FIG. 1 as being a server-type computing device that is accessible via network 102. In some implementations, at least a portion of the functionality of voice action system 106 may be implemented in user devices 104.

Voice action system 106 may include various modules or engines used to perform various functions of voice action system 106. For example, a speech recognition engine 116 may be configured to receive voice input signals from user devices 104 and determine textual output strings based on the voice input. The textual output of speech recognition engine 116 may be parsed by a semantic parser 118 to determine whether or not the output corresponds to one of a predetermined set of voice actions. A command execution engine 120 may be configured to implement certain actions depending on the determination made by semantic parser 118. For example, if the voice input is determined by semantic parser 118 to correspond to a voice action, command execution engine 120 may be configured to implement an action associated with the particular voice action. If the voice input is determined not to correspond to a particular voice action, command execution engine 120 may be configured to implement some default action, such as performing an Internet search (e.g., using a search engine such as Google.com) using the text string associated with the voice input. Speech recognition engine 116, semantic parser 118, command execution engine 120, and/or various other modules or engines of voice action system 106 may be implemented using machine-readable instructions that are stored in a memory 114 (e.g., any machine-readable medium, such as a hard disk, flash memory, RAM, ROM, removable storage, cloud or network-based storage, etc.) associated with voice action system 106 and that may be executed by at least one processor 112 (e.g., any general-purpose or special-purpose processor) of voice action system 106.

Speech recognition engine 116 is configured to receive data representing a voice input (e.g., an audio-related data file or signal) and infer a textual output to be associated with the voice input. Speech recognition engine 116 is configured to convert the voice input to a textual output using one or more language models stored in a language model database 110 (e.g., any machine-readable medium). In various illustrative implementations, language model database 110 may be stored in a memory that is local to voice action system 106 or that is remotely accessible by voice action system 106 via network 102. The language model may include a general language model 122 that includes words and phrases for a relevant language (e.g., English, Spanish, etc.) of the voice action system and a voice action language model 124 that includes words and phrases that are specific to certain special predetermined voice actions. The language model may include data for each of the words and/or phrases representing an aural format of the words and/or phrases, and the voice input may be compared to this data to deduce which words and/or phrases are likely to have been intended by the user. The textual words/phrases associated with the identified aural-formatted data and then selected and provided as an output text string. In some implementations, a single likely match may not be identified and the user may be presented with multiple options from which he may choose that are possible matches for the voice input.

In some implementations, speech recognition engine 116 may be configured to convert voice input into text output using language models in conjunction with other tools or sources of knowledge. The language models may compute probabilities of word sequences and may be used to identify what word sequences are more likely than others to be included in the voice input. A lexicon model may be used to identify how each word contained in the voice input may be decomposed into a sequence of phonemes. An acoustic model may be used to identify how each phoneme fits within the context of other phoneme sounds and map phonetic identity to the voice input. In such an implementation, the language model(s), lexicon model and acoustic model may be used in combination to convert the voice input into a text output.

Semantic parser 118 is configured to parse the textual output from speech recognition engine 116 and determine whether or not the text associated with the voice input corresponds to a voice action of voice action language model 124. In some implementations, each type of voice action may have an associated triggering phrase and an action. The triggering phrase may be a phrase within the text associated with the voice input that signifies to voice action system 106 that a particular predetermined voice action is to be performed. Semantic parser 118 may be configured to analyze the constituent words of the voice input text provided by speech recognition engine 116 and determine if part or all of the voice input text matches a carrier or triggering phrase of one of the voice actions. If the voice input text includes a triggering phrase, semantic parser 118 may be configured to parse the text to separate the triggering phrase and the remaining input data to be used in performing the action. An example is provided below in XML-type pseudo-code:
<action: MAP>
query: "map of Madrid, Spain"
parsed query: "Madrid, Spain"
</action>

In this example, semantic parser 118 determines that the text "map of Madrid, Spain" includes a triggering phrase "map of" indicating to semantic parser 118 that the "MAP" voice action should be performed. The action associated with the "MAP" voice action may be opening a mapping application (e.g., Google Maps) and displaying a map of a location referenced in the voice input text. In the example above, the "map of" triggering phrase is separated from the remainder of the text string, leaving the location data "Madrid, Spain" as input data for use in performing the mapping action. In some implementations, if the voice input text does not include a triggering phrase associated with a voice action, the parsed text may include the entire input text.

Command execution engine 120 is configured to implement the action associated with the voice input. If semantic parser 118 determines that the voice input is associated with a voice action, then command execution engine 120 may execute the action associated with the voice action. In the example provided above, command execution engine 120 may cause a map of Madrid, Spain to be displayed in a mapping application on the user device 104.

If the voice input is not associated with a voice action, command execution engine 120 may be configured to perform a default action using the voice input text. In some illustrative implementations, an Internet search (e.g., using Google.com) may be performed using the voice input text as input, and the results may be presented on the user device 104 (e.g., in a browser application). In various other implementations, any other types of default actions may be taken in response to voice input that is not recognized as corresponding to a voice action triggering phrase, or a message may be presented to the user indicating that the requested action does not correspond to a supported voice action and asking what action the user wishes to take.

In various implementations, some or all of the action may be performed by voice action system 106 and/or some or all of the action may be performed by user device 104. In one example where the action to be taken is performing an Internet search, voice action system 106 may be configured to send the voice input text to the search engine, receive the results, and then pass the results to user device 104 for presentation to the user. In another example where the action is playing a music file stored on user device 104, voice action system 106 may send a signal to user device 104 indicating that the user wishes to play music and providing the data in the parsed voice input text that can be used by user device 104 to identify the desired music.

In various implementations, various different types of voice actions may be supported by voice action system 106. Various non-limiting, illustrative examples of such voice actions are provided below, with example triggering phrases provided in italics:

"send text to [recipient] [message]"—send a text message to [recipient] having a message of [message] using text message application "listen to [artist/song/album]"—play music by [artist]/play [song]/play songs in [album] in music/media application "navigate to [address/city/business name]"—provide navigation (e.g., turn-by-turn) directions to [address/city/business name] in mapping/navigation application "call [business name] [location]"—call [business name] using phone application. Search for desired business can be improved using [location] of business.

"call [contact name] [phone type]"—call [contact name] (e.g., contact in a contacts application) using phone application. If multiple different phone numbers stored for [contact name] (e.g., home, work, mobile, etc.), [phone type] can be used to select desired number.

"send email to [recipient] [subject] [body]"—send email to [recipient] having subject line [subject] and body field [body] using email application "map of [address/city]"—display map of [address/city] in mapping application "go to [website]"—navigate to [website] in web browsing application "note to self [message]"—Save a note with content [message] in a notes application "[your query]"—perform search engine search of [your query]. In this illustrative implementation, this is a default action if [your query] does not correspond to another voice action. In some implementations, this may not be a default action;

for example, a search could be triggered based off of the triggering phrase "search web for . . . ".

The illustrative voice actions provided above are given for purposes of illustration only and may differ in various implementations (e.g., more, less, or different voice actions may be supported). Some voice actions may include complex or multi-step actions. For example, a voice action triggered by "call [business name] [location]" may trigger a series of actions that include searching a directory of businesses based on the business name and location, identifying whether there is a match, calling the phone number associated with the business if there is a match, and presenting multiple options to the user if there is not a match. Voice action systems often support a set of predetermined voice actions that have defined triggering phrases and associated actions.

Various illustrative implementations of voice action system 106 may enable custom voice actions to be created based on input from third parties and implemented within voice action system 106. For example, advertisers may submit bids (e.g., monetary bids) for voice action system 106 to be modified to include particular voice actions specified by the advertisers. The voice actions associated with the winning bids may be implemented in voice action system 106. While much of the present disclosure focuses on implementations in which voice action bids are received from an advertiser, in another illustrative implementation, voice action suggestions may be solicited from users, and one or more suggestions may be implemented in voice action system 106. Various illustrative features described with respect to advertising-related implementations are equally applicable to such a user-based voice action suggestion implementation.

Voice action bids may be received from one or more advertisers through the use of one or more advertiser devices 108. Advertiser devices 108 may be any type of computing devices, such as desktop computers, laptop computers, tablet computers, smartphones, or any other type of computing device. The voice action bids may include an offer by the advertiser to provide a benefit (e.g., to an operator of voice action system 106) in exchange for one or more voice actions being implemented in voice action system 106. The benefit may be, for example, a dollar amount. Each of the one or more voice actions associated with a voice action bid may include at least one triggering phrase and an action to be taken upon detection of the triggering phrase. In some implementations, multiple triggering phrases may be used to trigger a single action. For example, a fictional Acme Widget Company may submit a bid for the phrases "Acme widgets are great!", "Take me to Acme!", and "Today's Acme deals" to all cause a web browser of user devices 104 to navigate to a current specials webpage on the Acme Widget Company website.

In some implementations, the voice action bids may include bids for a voice action grammar including several voice actions to be added to voice action system 106. For example, Acme Widget Company may submit a voice action bid for three voice actions to be added to voice action system 106. The first voice action may cause a web browser of user devices 104 to navigate to the Acme Widget Company website upon receiving voice input corresponding to a first set of one or more triggering phrases. The second voice action may cause a phone application of user devices 104 to call a phone number of the Acme Widget Company upon receiving voice input corresponding to a second set of one or more triggering phrases. The third voice action may cause a mapping application of user devices 104 to show a map for a retail location of the Acme Widget Company upon receiving voice input corresponding to a third set of one or more triggering phrases. Enabling the submission of voice action grammar bids may allow an advertiser to create a coordinated voice action marketing plan based on users being able to perform multiple different voice actions relating to the advertiser.

In some implementations, the voice action bids may be limited to a particular scope. For example, in some implementations, one or more voice action bids may relate to implementing the associated voice actions for a limited timeframe (e.g., certain hours of the day, certain days of the week, for a limited time such as a day, week, month, etc.). In one illustrative implementation, the voice action bids may represent bids to be included within "voice actions of the day" to be implemented for a one day period, "voice actions of the week" to be implemented for a one week period, etc. In another example, one or more voice action bids may be limited in geographic reach (e.g., may be implemented only for user devices 104 located in one or more defined geographic areas, as detected using positioning circuits of user devices 104 such as GPS, cellular towers to which user devices 104 are connected, wireless access points to which user devices 104 are connected, etc.). In yet another example, voice action bids may be applied only to user devices 104 of users known to meet certain characteristic requirements (e.g., demographic characteristics, user device characteristics, etc.).

Voice action system 106 may be configured to receive multiple voice action bids from advertisers submitted using advertiser devices 108 and select one or more voice action bids to be implemented in voice action system 106. In some implementations, voice action system 106 may be configured to automatically select bids for implementation based on predetermined criteria, such as benefit characteristics (e.g., monetary offering for implementing bid), advertiser characteristics (e.g., advertiser type and/or industry), characteristics of other voice actions that have already been implemented and/or selected for implementation, etc. In one implementation, voice action system 106 may be configured to automatically select a predetermined number of the highest bids, or the bids representing the highest monetary offers for implementing the voice actions. In some implementations, voice action bids may be selected based at least in part on manual selections made by a human.

Voice action system 106 may be configured to implement the voice actions associated with the selected bids within voice action language model 124 of language model database 110. In some implementations, predetermined, general voice actions that are not associated with advertiser-submitted bids and do not change on a regular basis may be stored in a general voice action language model 126 and voice actions implemented based on selected advertiser bids may be stored in an advertiser voice action language model 128. Advertiser voice action language model 128 may be configured or organized to be modified dynamically or regularly as new voice action bids are selected and/or time-dependent voice action bids expire. Once the voice actions associated with the bids are implemented in voice action language model 124, voice action system 106 may be configured to execute the voice actions in a manner similar to the general voice actions upon detection of voice input corresponding to the triggering phrases of the advertiser-provided voice actions.

Voice action system 106 may be configured to add words and/or phrases included in the triggering phrases of the voice action bids to general language model 122, when necessary, to enable voice action system 106 to recognize the words and/or phrases in voice input received from user devices 104 and translate the voice input to the appropriate text. For example, a triggering phrase of an illustrative voice action may be "Zweebork deal of the day." The phrase "deal of the day" and its constituent words may already be stored in general language model 122, but general language model 122 may not have previously included the term "Zweebork." In this example, voice action system 106 may be configured to add the term "Zweebork" to general language model 122 so that, when voice input corresponding to the phrase "Zweebork deal of the day" is received, voice action system 106 can accurately recognize the phrase and translate it to text associated with the triggering phrase.

In some implementations, a voice action bid may include an offer for changing an action associated with a triggering phrase of an already-existing voice action (e.g., a general voice action). For example, an illustrative general voice action may have a triggering phrase "find [business type] near [address/city]" that may cause a list of businesses of type [business type] that are located near [address/city] to be presented on user device 104. An example voice action bid from a fictional restaurant Little Italy located in Mountain View, Calif. may include a bid for modifying the "find [business type] near [address/city]" voice action such that a voice input of "find restaurant near Mountain View, Calif." results in a specified action. In one example, the voice input of "find restaurant near Mountain View, Calif." may cause Little Italy to appear at the top of the list of restaurants presented on user device 104. In another example, the voice input of "find restaurant near Mountain View, Calif." may cause a message to be presented to the user suggesting that the user try Little Italy before the list of restaurants is presented. In yet another example, the voice input of "find restaurant near Mountain View, Calif." may cause a list of optional actions to appear to the user (e.g., call Little Italy, map Little Italy, see reviews for Little Italy, get a coupon for Little Italy, view other restaurants near Mountain View, Calif., etc.) and allow the user to pick from the list.

Figure 2:
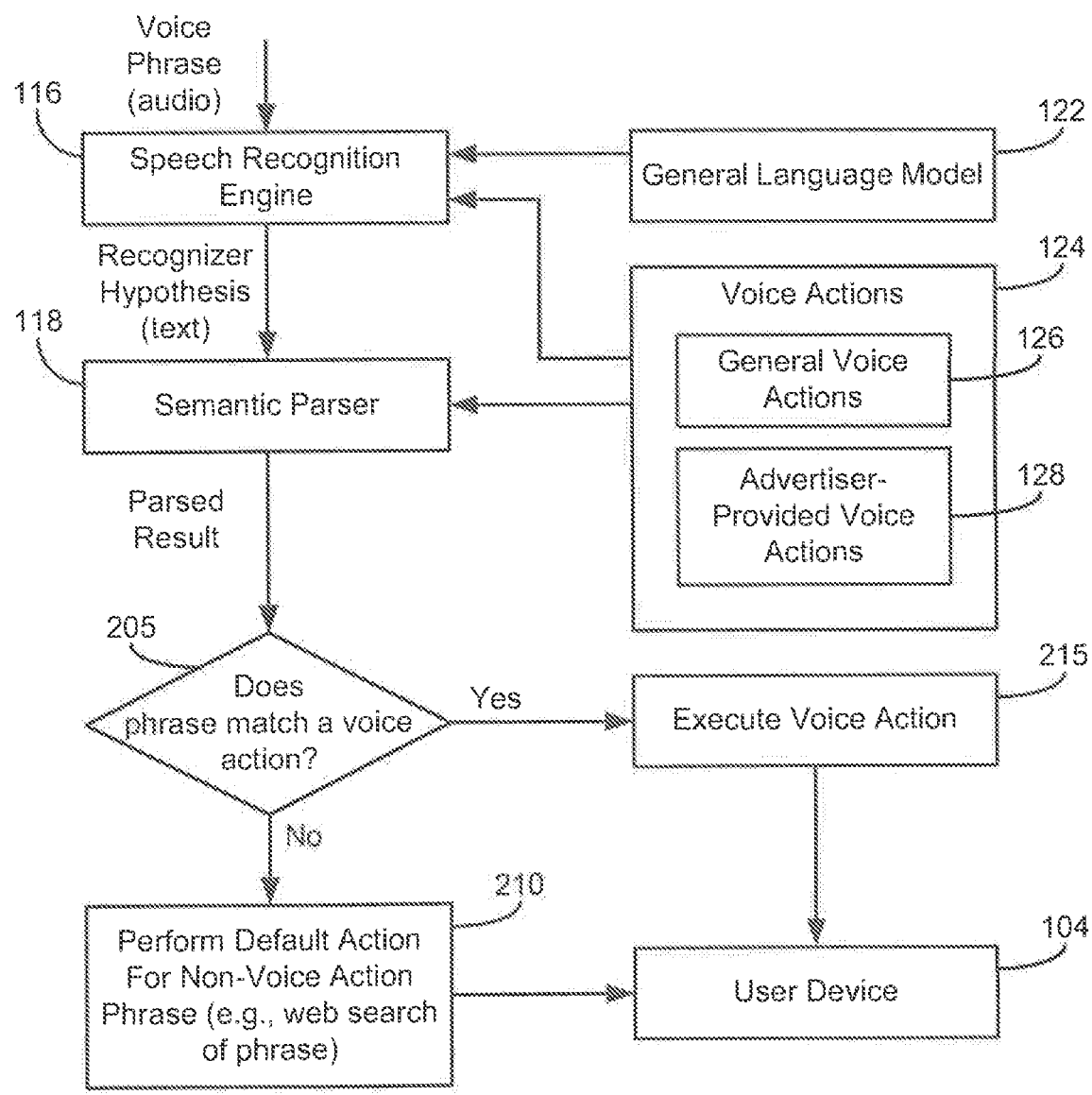
FIG. 2 is an example data flow diagram illustrating data flow through a voice action system configured to implement advertiser and/or user-specified voice actions according to an illustrative implementation.

FIG. 2 includes an example data flow diagram 200 illustrating data flow through voice action system 106 according to an illustrative implementation. A voice input phrase may be input by a user through a microphone or other audio input device of a user device 104. A signal representing the voice input is transmitted from user device 104 to speech recognition engine 116 of voice action system 106. Speech recognition engine 116 is configured to interpret the voice input audio signal and translate the audio signal into a voice input textual representation. Speech recognition engine 116 may use a set of words and/or phrases stored in general language model 122 to determine the appropriate textual words/phrases that correspond with the voice input. In some implementations, speech recognition engine 116 may use words/phrases stored in voice actions language model 124 in determining the textual output, as voice actions language model 124 may or may not include words/phrases not necessarily included in general language model 122.

The voice input text corresponding to the voice input may then be parsed by semantic parser 118. Semantic parser 118 may use voice actions language model 124 to parse the voice input text. In some instances, part or all of the voice input text may correspond to triggering phrases of general voice actions stored in general voice action language model 126, and general voice action language model 126 may be used to parse the voice input text. In other instances, part or all of the voice input text may correspond to triggering phrases of advertiser-provided voice actions stored in advertiser voice action language model 126, and advertiser voice action language model 126 may be used to parse the voice input text. In still other instances, the voice input text may not correspond to triggering phrases of any voice actions, and semantic parser 118 may be configured to identify that the voice input is not associated with a particular predetermined voice action of general voice action language model 126 or advertiser voice action language model 128.

Once the text is parsed, voice action system 106 may be configured to implement an appropriate voice action based on the parsed text (e.g., using command execution engine 120) (205). If the voice input is determined not to correspond to a voice action defined within voice action language model 124, a default action may be implemented, such as performing a search on a search engine using the voice action text and displaying the results in a browser on user device 104 (210). If the voice input is determined to correspond to a voice action defined within voice action language model 124, the action associated with the identified voice action is performed by voice action system 106 and/or user device 104 (215).

In some implementations, speech recognition engine 116 may be configured to determine the textual output to be associated with a particular voice input based at least in part on probabilities associated with particular words and/or phrases stored in general language model 122 and/or voice action language model 124. In some implementations, certain words, phrases, and/or groups of words may be weighted differently to increase or decrease the likelihood that such words/phrases will be identified by speech recognition engine 116 when voice input is received.

Figure 3:
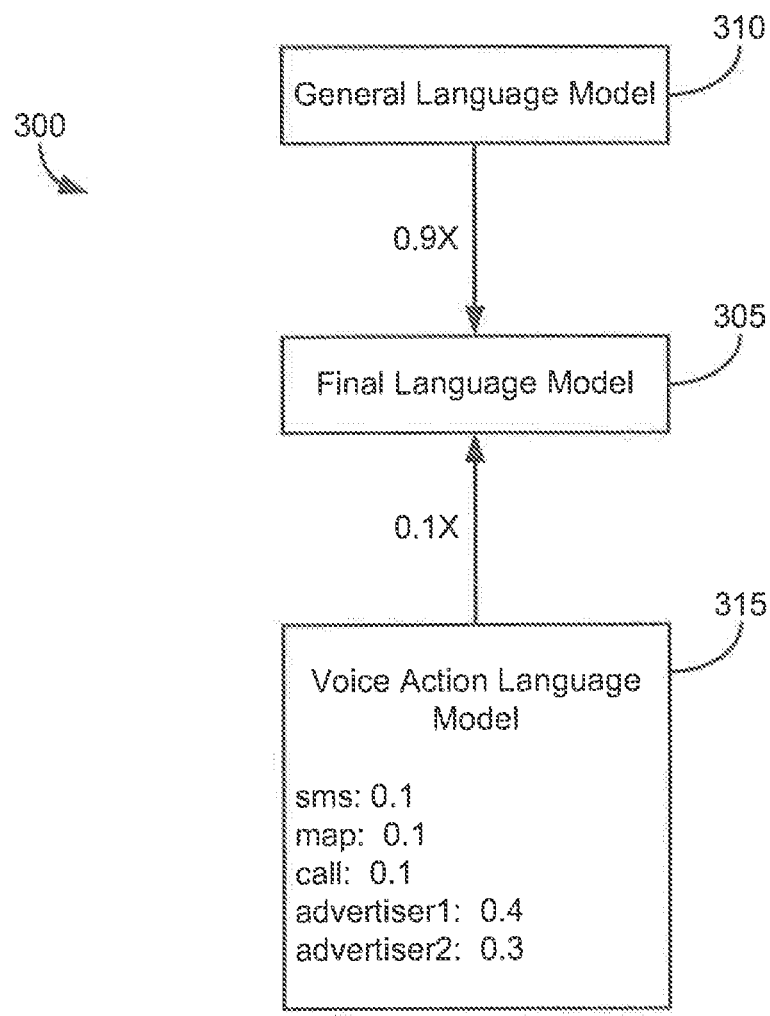
FIGS. 3 and 4 are block diagrams of example language models that may be used in a voice action system according to an illustrative implementation.

FIG. 3 illustrates a block diagram 300 of example language models that may be used in a voice action system such as voice action system 106, according to an illustrative implementation. A final language model 305 used by a speech recognition engine to translate voice input into textual output may include words and phrases from a general language model 310 and a voice action language model 315. Each of the words and/or phrases in language models 310 and/or 315 may be assigned a probability weighting for use in determining whether an input phrase is likely to be determined to be associated with the word/phrase of the language model. In voice action language model 315, for example, an "sms" triggering word has a probability weighting of 0.1, as does a triggering word "call". Language models 310 and 315 may have different weights applied to the collective language models as well. For example, words/phrases from general language model 310 are weighted with a weight of 0.9 times their individual probability weightings within final language model 305, which words/phrases from voice action language model 315 are given a weight of 0.1 times their individual weightings. In some implementations, the probability of identifying a voice input as corresponding to an individual term in voice action language model 315 may still be higher than an individual term in general language model 310 if, for example, there are a much greater number of words in general language model 310 and each individual term in general language 310 has a low individual probability.

The speech recognition engine may be configured to consider the probabilities when determining the textual output that should be associated with a particular voice input. In some implementations, the speech recognition engine may be configured to determine a set of possible words/phrases that may correspond to the voice input. The speech recognition engine may determine which words/phrases to select from the possibilities based in part on the probabilities. For example, if the speech recognition engine determines that the voice input may be associated with one of seven different possible text outputs, and one of the text outputs has a probability weight of 0.05 while the others have a probability weight of 0.01-0.02, the speech recognition engine may be configured to select the output associated with the higher 0.05 weight.

In some implementations, the probability weighting associated with certain words/phrases (e.g., triggering phrases for advertiser-provider voice actions) may be increased to increase the chance that a voice input will be determined to correspond to the words/phrases. For example, a triggering phrase provided by advertiser 1 in voice action language model 315 may be assigned a probability weight of 0.4, which is four times higher than that of the "sms" or "call" triggering phrases.

Figure 4:
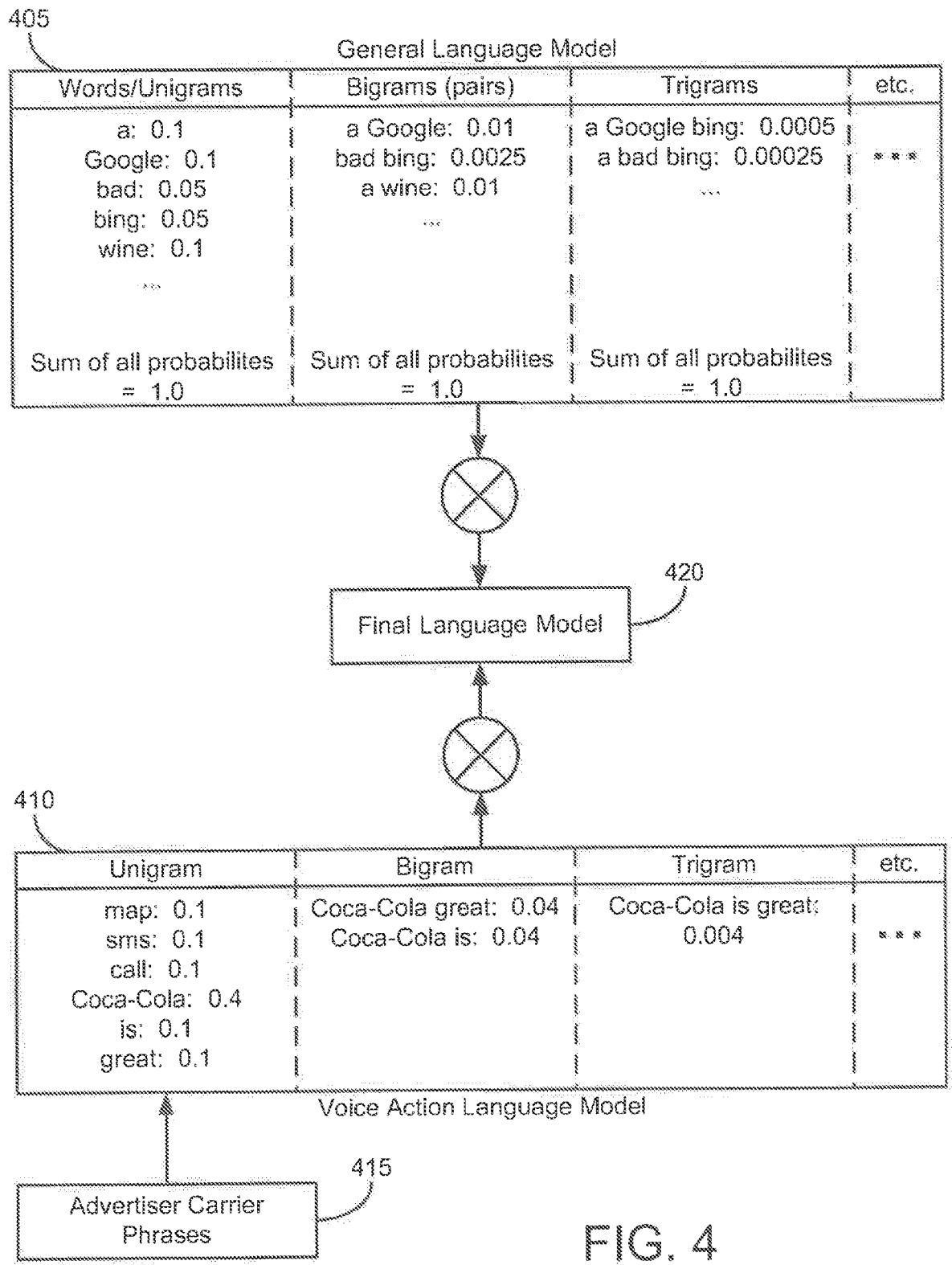

FIG. 4 illustrates a more detailed block diagram 400 of example language models that may be used in a voice action system such as voice action system 106, according to an illustrative implementation. As illustrated in diagram 400, a general language model 405 and a voice action language model 410 may each include a set of words (unigrams) and/or phrases (e.g., bigrams, trigrams, etc.) that each have weighting probabilities associated therewith. Some of the words/phrases in voice action language model 410 may be part of triggering or carrier phrases 415 obtained from advertisers (e.g., as part of voice action bids). For example, "Brand 1 is great" may be a triggering phrase for a voice action. If it was desired to increase the probability that voice input would match "Brand 1 is great," the probability associated with that phrase could be increased from 0.004 to some higher number, such as 0.01. In some implementations, the probability could be increased for a specified timeframe, for particular types of users, in particular geographic regions, etc. In some implementations, the sum of probabilities for all words, the sum of probabilities for all bigrams, the sum of probabilities for all trigrams, etc. for each language model may be required to equal 1.00 or 100%, such that increasing the probability of one word or phrase requires a corresponding decrease in the probability of one or more other words or phrases.

In some implementations, a language model (e.g., a general language model and/or a voice action language model) may be modified to adjust a probability that a word or phrase that is not a part of a general language model will be recognized from a voice input phrase. In some illustrative implementations, an advertiser may provide a brand name or product name that is not in the general language model as part of a voice action bid. For example, an advertiser may submit a voice action bid that includes the phrase "Ultraburger rocks" and the word "Ultraburger" may not appear in the general language model. The voice action system may add the word "Ultraburger" and the bigram phrase "Ultraburger rocks" to the language model. The sum of all unigram (i.e., single word tokens) probabilities in the language model may be represented as 1.0 as shown in the following:

$$\sum_{i=0}^{N-1} p_i = 1.0$$

When a new word is added to the language model, the word may be assigned a probability of $\varepsilon$ and the probabilities $p_i$ associated with existing words may be multiplied by a factor of $(1-\varepsilon)$ to ensure that the sum of the probabilities associated with all words in the language model still adds up to 1.0. The probabilities of the words in the revised language model may be represented as follows:

$$(1-\varepsilon)\sum_{i=0}^{N-1} p_i + \varepsilon = 1.0$$

By assigning the new word a probability $\varepsilon$ and multiplying the probabilities $p_i$ associated with existing words by a factor of $(1-\varepsilon)$, a portion of the total probability previously associated with the words existing in the language model is reassigned or redistributed to the new advertiser-provided word. This process can be repeated for multiple words in an advertiser- or user-provided phrase and/or for phrases (e.g., bigrams, such as "Ultraburger rocks").

In some implementations, the probability associated with an advertiser- or user-provided word and/or phrase may be adjusted to increase or decrease the likelihood that a voice input from a user will be interpreted to include the word and/or phrase. For example, a probability $\varepsilon$ associated with a particular advertiser-provided term or phrase (e.g., the term "Ultraburger" or the phrase "Ultraburger rocks") may be raised to increase the probability that a voice input from a user may be recognized as corresponding to the advertiser-provided term or phrase. In some implementations, an advertiser-provided word may be assigned a uniform probability weight with the other words in the language model, which may be represented as E=1.0/N, where N is the total number of words in the language model. The probability $\varepsilon$ may then be adjusted up or down to increase or decrease the probability associated with the word or phrase as desired. In some implementations, a maximum probability limit (e.g., substantially less than 1.0) may be used to prevent against the probability $\varepsilon$ being set too high such that the speech recognition engine produces a high proportion of false positives that mistakenly identify the associated word or phrase as corresponding to voice input. In various implementations, the probability $\varepsilon$ associated with a particular advertiser- or user-provided word or phrase may be manually set or adjusted by a user or may be automatically set or adjusted according to an algorithm. The amount of the adjustment may be a set amount or group of amounts (e.g., predetermined amount and/or based on predetermined variables, such as similarity to existing words, price associated with a bid, etc.) and/or may be determined based on trial-and-error by implementing changes (e.g., incremental changes) and determining whether the changes boost the recognition of the word or phrase without producing an unacceptable amount of false positives.

In some implementations, a language model may be modified to adjust a probability associated with a word or phrase that is already a part of the language model. For example, an advertiser may submit a voice action bid that proposes to cause a particular action to be performed based on speech recognition of the phrase "I love subs" in voice input. In this example, all three words included within the phrase "I love subs" may be part of a general English language model and may have predetermined associated probabilities. Again, the sum of all unigram (i.e., single word tokens) probabilities in the language model may be represented as 1.0 as shown in the following:

$$\sum_{i=0}^{N-1} p_i = 1.0$$

In this example, the words whose probabilities are being altered (e.g., increased or boosted) already exist in the language model. A word k that already exists in the language model may have a previously assigned probability $p_k$. The probability of word k may be boosted by multiplying the initial probability $p_k$ by a factor $\alpha$, where $\alpha>1.0$, to produce a modified probability for word k of $p_k'$. The probabilities $p_k$ and $p_k'$ may be required to be greater than 0, such that it is possible for word k to be recognized from voice input, and less than 1.0, such that every voice input is not recognized as corresponding to word k.

When the probability of word k is increased based on factor $\alpha$, the probabilities of one or more of the remaining $N-1$ words of the language model may be decreased to ensure that the total probability associated with the sum of the words for the language model still totals 1.0. In some implementations, the probabilities for the remaining words of the language model may be adjusted by a factor $\beta$. In order to illustrate the change in probabilities, the initial sum of probabilities prior to changes can be expressed such that the probability associated with token k is separated from the probabilities associated with the other words of the language model, as follows:

$$\sum_{i=0}^{N-1, i \neq k} p_i + p_k = 1.0$$

The probability $p_k$ for word k may be boosted to a higher probability $p_k'>p_k$ where $0<p_k'<1$. The probabilities for the remaining words of the remaining words of the language model may be adjusted by a factor ft as represented by the following:

$$\beta \sum_{i=0}^{N-1, i \neq k} p_i + p_k' = 1.0$$

The factor $\beta$ may be expressed as follows:

$$\beta \frac{1-p_k'}{\sum_{i=0}^{N-1, i \neq k} p_i} \frac{1-p_k'}{1-p_k} = \frac{1-\alpha p_k}{1-p_k}$$

In some implementations, such as described above, a uniform weighting factor $\beta$ may be applied to the remaining tokens of the language model to account for an increase in the probabilities associated with one or more tokens. In some implementations, probabilities associated with select remaining tokens of the language model may be adjusted and others may remain the same rather than applying a uniform adjustment to all remaining tokens. In some implementations, a maximum probability limit (e.g., substantially less than 1.0) may be used to prevent against the probability a being set too high such that the speech recognition engine produces a high proportion of false positives that mistakenly identify the associated word or phrase as corresponding to voice input. In various implementations, the probability a associated with a particular advertiser- or user-provided word or phrase may be manually set or adjusted by a user or may be automatically set or adjusted according to an algorithm. The amount of the adjustment may be a set amount or group of amounts (e.g., predetermined amount and/or based on predetermined variables, such as similarity to existing words, price associated with a bid, etc.) and/or may be determined based on trial-and-error by implementing changes (e.g., incremental changes) and determining whether the changes boost the recognition of the word or phrase without producing an unacceptable amount of false positives. In some implementations (e.g., when the probability of a particular token is being increased), the altered probability $p_k'$ for a word k may be at least a uniform probability $1/N$ and may be larger than an initial probability $p_k$ for the word k. In some implementations, the voice action system may prohibit the boosting of probabilities for very common words of the language model (e.g., "at" and/or "the") that may already be associated with substantially high probabilities.

In some implementations, an amount (e.g., factors E and/or a above) by which the probability associated with a token (e.g., a word and/or phrase) is boosted may be determined based at least in part on the voice action bid associated with the token. For example, a boosting factor associated with a particular voice action phrase may be determined based on a monetary value or other benefit offered by the advertiser in association with the bid. In some implementations, advertisers having winning bids may be invited to boost the probabilities of the voice action phrases associated with the bids by paying a boosting fee. Different fee levels may be offered that correspond to different boosting factors (e.g., a slight boost, a moderate boost, and a substantial boost).

Figure 5:
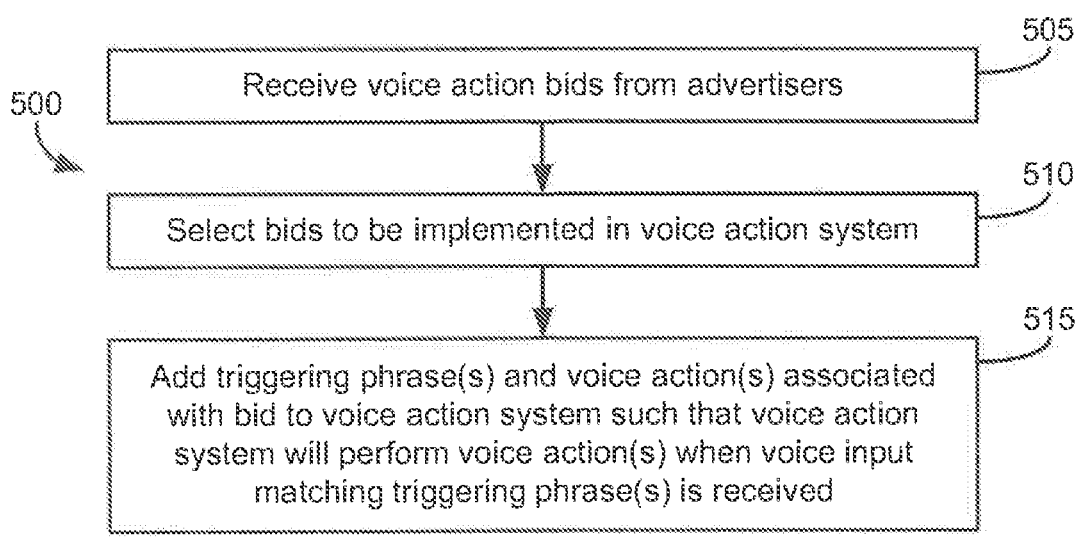
FIG. 5 is a flow diagram of an example process for implementing advertiser and/or user-specified voice actions in a voice action system according to an illustrative implementation.

FIG. 5 illustrates a flow diagram of an example process 500 for implementing advertiser and/or user-specified voice actions in a voice action system according to an illustrative implementation. In some implementations, process 500 may be implemented using one or more components of a system such as system 100.

A voice action system may be configured to receive voice action bids from two or more advertisers (505). Each bid may represent an offer for modifying the voice action system to include a voice action associated with the bid, and each voice action may have an associated triggering phrase and action. One or more of the bids may be selected for implementation within the voice action system (510). For each of the selected bids, the triggering phrase associated with the voice action of the bid may be added to the voice action system (515). Once the triggering phrase has been added, voice input received by the voice action system may be analyzed and compared against the advertiser-provided voice action triggering phrases. If a match is found, the action associated with the relevant advertiser-provided voice action may be executed by the voice action system and/or by a device of the user who provided the voice input.

Figure 6:
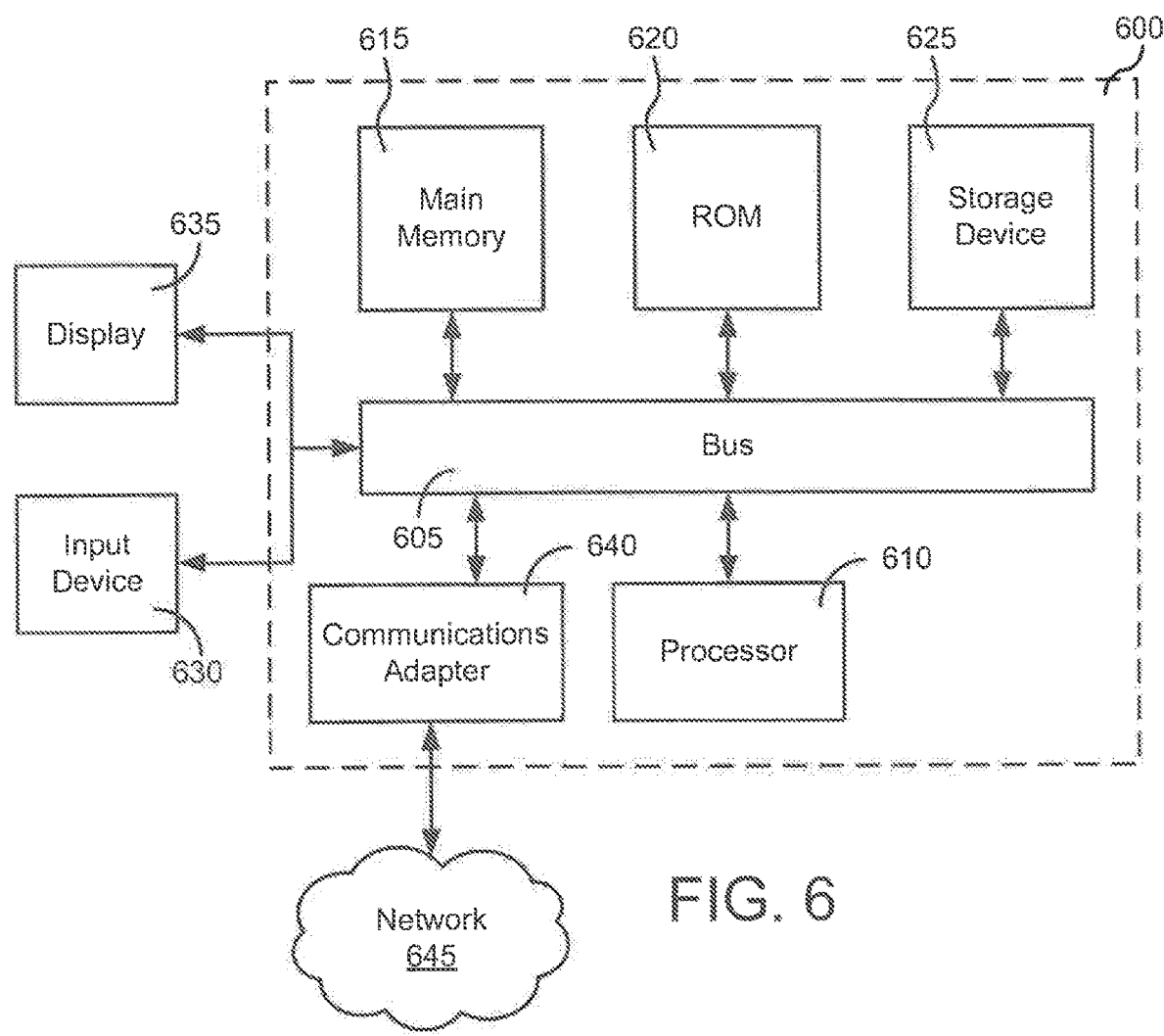
FIG. 6 is a block diagram of an example computing system according to an illustrative implementation.

FIG. 6 illustrates a depiction of a computer system 600 that can be used, for example, to implement an illustrative user device 104, an illustrative voice action system 106, an illustrative advertiser device 108, and/or various other illustrative systems that may be used in the implementation of an environment that is configured to enable the use of voice actions as described in the present disclosure. The computing system 600 includes a bus 605 or other communication component for communicating information and a processor 610 coupled to the bus 605 for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

In some implementations, the computing system 600 may include a communications adapter 640, such as a networking adapter. Communications adapter 640 may be coupled to bus 605 and may be configured to enable communications with a computing or communications network 645 and/or other computing systems. In various illustrative implementations, any type of networking configuration may be achieved using communications adapter 640, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination in a single implementation. Conversely, various features that are described in the context of a single implementation can also be carried out in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purposes of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to command a computing device, comprising:
   one or more servers comprising one or more processors and memory;
   a voice action system executed by the one or more servers to:
   receive, via a network from a first provider device, a first voice action that includes a first plurality of triggering phrases and a first action;
   identify a second voice action that includes a second triggering phrase for a second action different from the first action, the second triggering phrase different from each of the first plurality of triggering phrases;
   select, based on a predetermined criteria, the first voice action from a set comprising the first voice action and the second voice action;
   increase, via modification of a voice action language model and responsive to the selection of the first voice action based on the predetermined criteria, a likelihood that a voice input matches at least one of the first plurality of triggering phrases relative to the second triggering phrase; and
   configure the first voice action selected based on the predetermined criteria to perform, via the computing device, the first action of the first voice action responsive to the voice input matching the at least one of the first plurality of triggering phrases of the first voice action.

2. The system of claim 1, wherein the second action is a default action.

3. The system of claim 1, wherein the second action is performed responsive to voice input not matching the first plurality of triggering phrases.

4. The system of claim 1, comprising:
   the voice action system to receive, from the computing device comprising a digital assistant, the voice input corresponding to the at least one of the first plurality of triggering phrases of the first voice action; and
   the voice action system to cause, responsive to receipt of the voice input corresponding to the at least one of the first plurality of triggering phrases of the first voice action, the computing device to perform the first action.

5. The system of claim 1, comprising:
   the voice action system to cause the computing device to perform the first action comprising a series of actions.

6. The system of claim 1, comprising:
   the voice action system to cause the computing device to perform the first action comprising searching a directory, identifying a match in the directory, initiating a call to a phone number corresponding to the match, or presenting a plurality of options to the computing device.

7. The system of claim 1, comprising:
   the voice action system to receive from a digital assistant, the voice input corresponding to the at least one of the first plurality of triggering phrases of the first voice action; and
   the voice action system to cause, responsive to receipt of the voice input corresponding to the at least one of the first plurality of triggering phrases of the first voice action, the computing device to perform the first action comprising displaying a website in a browser application.

8. The system of claim 1, comprising:
   the voice action system to receive from a digital assistant, second voice input that does not correspond to any of the first plurality of triggering phrases; and
   the voice action system to cause, responsive to receipt of the second voice input that does not correspond to any of the first plurality of triggering phrases, the computing device to perform the second action comprising a default action.

9. The system of claim 1, comprising:
   the voice action system to configure the first voice action to cause the computing device to perform the first action comprising at least two of displaying a website in a browser application, calling a telephone number, displaying a location via a mapping application, downloading a data file, presenting media content, sending an electronic message to a recipient device, performing a search via a search engine, or launching a chat application.

10. The system of claim 1, comprising the voice action system to:
    cause, responsive to receipt of the voice input corresponding to the at least one of the first plurality of triggering phrases of the first voice action based on the likelihood, the computing device to display a location via a mapping application executed by the computing device.

11. A method of commanding a computing device, comprising:
    receiving, by one or more servers via a network from a first provider device, a first voice action that includes a first plurality of triggering phrases and a first action;
    identifying, by the one or more servers, a second voice action that includes a second triggering phrase for a second action different from the first action, the second triggering phrase different from each of the first plurality of triggering phrases;
    selecting, based on a predetermined criteria, the first voice action from a set comprising the first voice action and the second voice action;

increasing, by the one or more servers and responsive to the selection of the first voice action based on the predetermined criteria, via modification of a voice action language model, a likelihood that a voice input matches at least one of the first plurality of triggering phrases relative to the second triggering phrase; and configuring, by the one or more servers, the first voice action selected based on the predetermined criteria to perform, via the computing device, the first action of the first voice action responsive to the voice input matching the at least one of the first plurality of triggering phrases of the first voice action.

12. The method of claim 11, wherein the second action is a default action.

13. The method of claim 11, wherein the second action is performed responsive to voice input not matching the first plurality of triggering phrases.

14. The method of claim 11, comprising:

receiving, from the computing device comprising a digital assistant, the voice input corresponding to the at least one of the first plurality of triggering phrases of the first voice action; and causing, responsive to receipt of the voice input corresponding to the at least one of the first plurality of triggering phrases of the first voice action, the computing device to perform the first action.

15. The method of claim 11, comprising:

causing the computing device to perform the first action comprising a series of actions.

16. The method of claim 11, comprising:

causing the computing device to perform the first action comprising searching a directory, identifying a match in the directory, initiating a call to a phone number corresponding to the match, or presenting a plurality of options to the computing device.

17. The method of claim 11, comprising:

receiving from a digital assistant, the voice input corresponding to the at least one of the first plurality of triggering phrases of the first voice action; and causing, responsive to receipt of the voice input corresponding to the at least one of the first plurality of triggering phrases of the first voice action, the computing device to perform the first action comprising displaying a website in a browser application.

18. The method of claim 11, comprising:

receiving from a digital assistant, second voice input that does not correspond to any of the first plurality of triggering phrases; and causing, responsive to receipt of the second voice input that does not correspond to any of the first plurality of triggering phrases, the computing device to perform the second action comprising a default action.

19. The method of claim 11, comprising:

configuring the first voice action to cause the computing device to perform the first action comprising at least two of displaying a website in a browser application, calling a telephone number, displaying a location via a mapping application, downloading a data file, presenting media content, sending an electronic message to a recipient device, performing a search via a search engine, or launching a chat application.

20. The method of claim 11, comprising:

causing, responsive to receipt of the voice input corresponding to the at least one of the first plurality of triggering phrases of the first voice action based on the likelihood, the computing device to display a location via a mapping application executed by the computing device.

* * * * *